US009888769B1

(12) United States Patent
Mroue

(10) Patent No.: US 9,888,769 B1
(45) Date of Patent: Feb. 13, 2018

(54) CONFIGURABLE SHELF ASSEMBLY

(71) Applicant: 8831386 Canada Inc., Laval (CA)

(72) Inventor: Joseph Mroue, Laval (CA)

(73) Assignee: 8831386 CANADA INC., Laval (CA)

( * ) Notice: Subject to any disclaimer, the term of this patent is extended or adjusted under 35 U.S.C. 154(b) by 0 days.

(21) Appl. No.: 15/283,560

(22) Filed: Oct. 3, 2016

(30) Foreign Application Priority Data

Aug. 10, 2016 (CN) ...................... 2016 2 0865450 U

(51) Int. Cl.
*A47B 47/00* (2006.01)
*A47B 91/00* (2006.01)
*F16B 1/00* (2006.01)

(52) U.S. Cl.
CPC ...... *A47B 47/0091* (2013.01); *A47B 47/0083* (2013.01); *A47B 91/00* (2013.01); *F16B 1/00* (2013.01); *F16B 2001/0035* (2013.01)

(58) Field of Classification Search
CPC . A47B 47/0091; A47B 47/0083; A47B 91/00; F16B 1/00; F16B 2001/0035; H01F 7/0252; A47C 13/005; A47C 17/34; A47C 31/003
USPC ............................................. 211/187; 13/187
See application file for complete search history.

(56) References Cited

U.S. PATENT DOCUMENTS

| 4,321,873 A * | 3/1982 | Nealis .................. A47B 87/005 108/101 |
| 4,337,709 A * | 7/1982 | Nicholson .............. A47B 13/08 108/33 |
| 5,746,139 A * | 5/1998 | Villanueva ............. A47B 45/00 108/102 |
| 5,911,394 A * | 6/1999 | Lee ......................... F16B 47/00 248/205.5 |
| 6,305,656 B1 * | 10/2001 | Wemyss ............. A47G 23/0216 206/5 |
| 7,302,768 B2 * | 12/2007 | Gajdacs .................. G09F 21/04 40/591 |
| 7,784,751 B1 * | 8/2010 | Bellows ................. A47B 91/00 248/188.2 |
| 7,817,005 B2 * | 10/2010 | Fullerton ............... B25H 3/021 220/230 |
| 7,843,294 B2 * | 11/2010 | Fullerton .............. H01F 7/0284 310/90.5 |
| 8,850,683 B2 * | 10/2014 | Haughey ............... A63H 33/046 29/428 |
| 2004/0178307 A1* | 9/2004 | Sim ......................... F16B 47/00 248/205.6 |
| 2009/0251250 A1* | 10/2009 | Tait ....................... H01F 7/0252 335/285 |
| 2009/0288528 A1* | 11/2009 | Fullerton ................. B25G 3/00 81/489 |
| 2012/0119629 A1* | 5/2012 | Nelson ................... A47B 87/00 312/111 |
| 2015/0239285 A1* | 8/2015 | Romero ................... B44C 5/00 40/800 |

(Continued)

*Primary Examiner* — Ko Hung Chan
(74) *Attorney, Agent, or Firm* — Perry + Currier Inc.

(57) ABSTRACT

A shelf assembly is provided. The shelf assembly includes at least one board. Each board has at least on connector on the bottom surface. Legs are configured to mate with the connector during assembly. In addition, the shelf assembly includes a shoe with a magnet in the shoe to position the legs on top of the board using positioning elements disposed on the board. A board and shoe are also provided.

7 Claims, 21 Drawing Sheets

(56) References Cited

U.S. PATENT DOCUMENTS

| | | | |
|---|---|---|---|
| 2016/0157605 A1* | 6/2016 | Grad | A47B 47/0083 |
| | | | 108/189 |
| 2016/0255734 A1* | 9/2016 | Otabachi | F16B 47/003 |
| | | | 248/205.3 |
| 2016/0331135 A1* | 11/2016 | Knudson | A47B 47/0091 |
| 2016/0374483 A1* | 12/2016 | Maldonado | A47F 7/06 |
| | | | 312/122 |

* cited by examiner

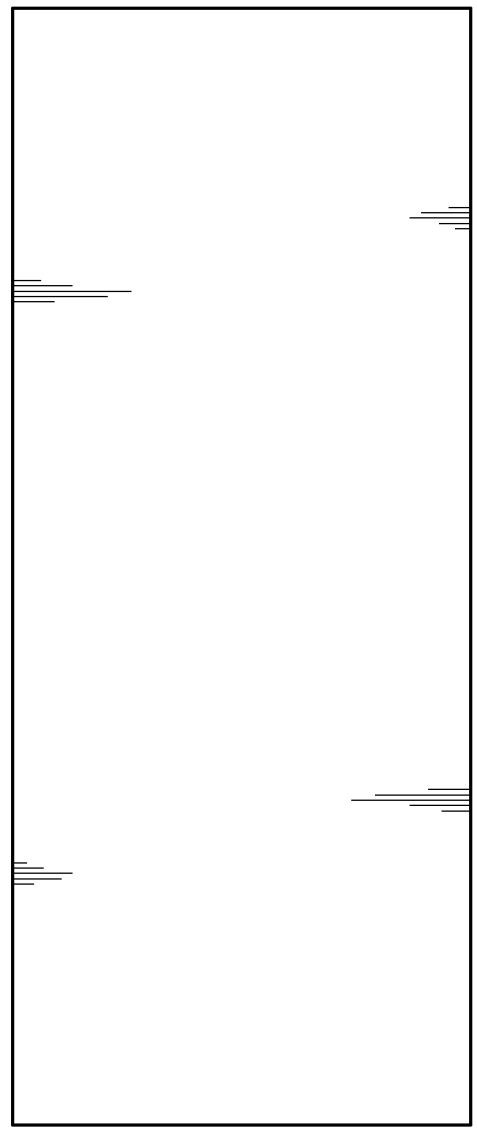
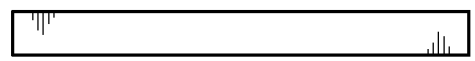
FIG. 9C
FIG. 9B
FIG. 9A
FIG. 9E
FIG. 9F

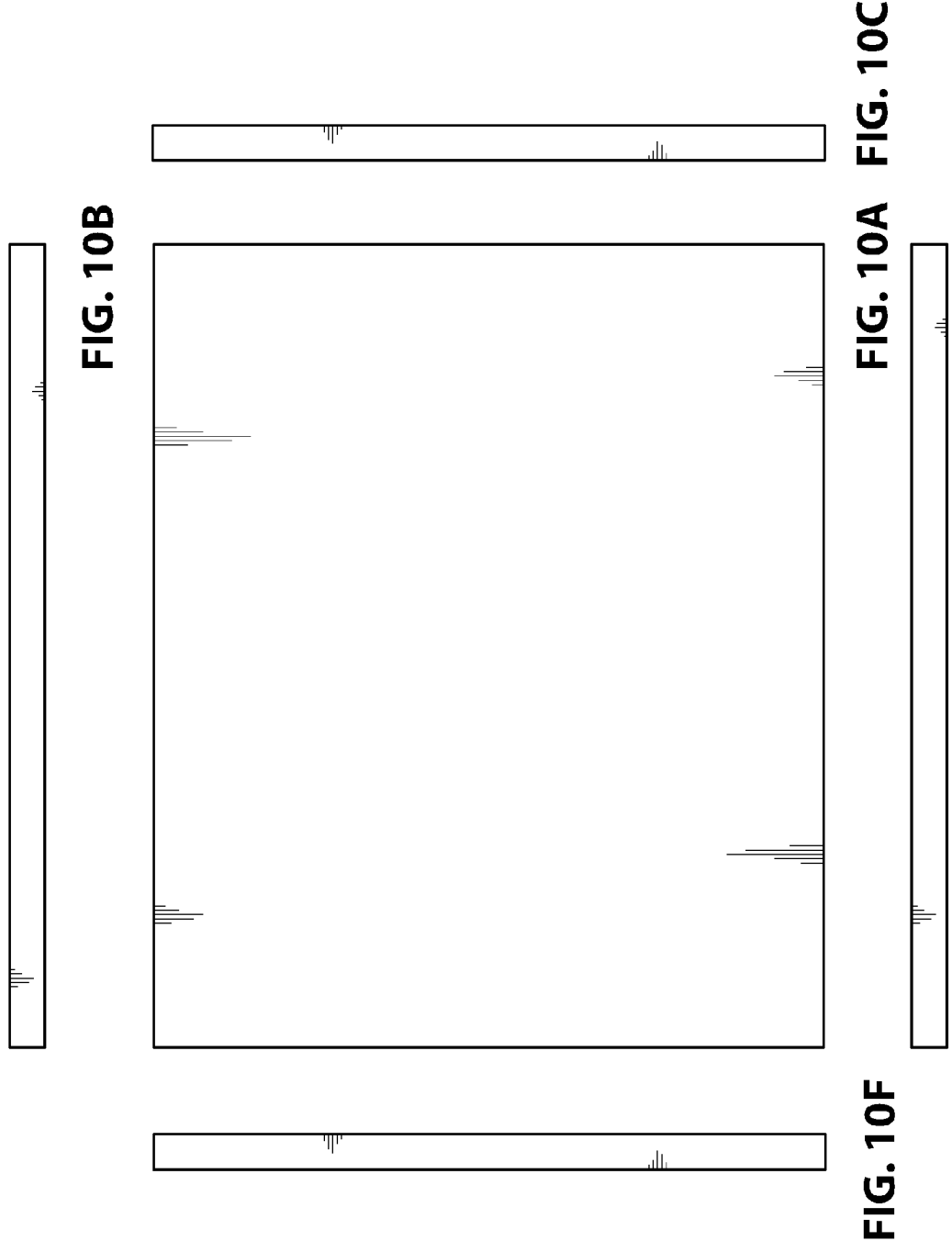

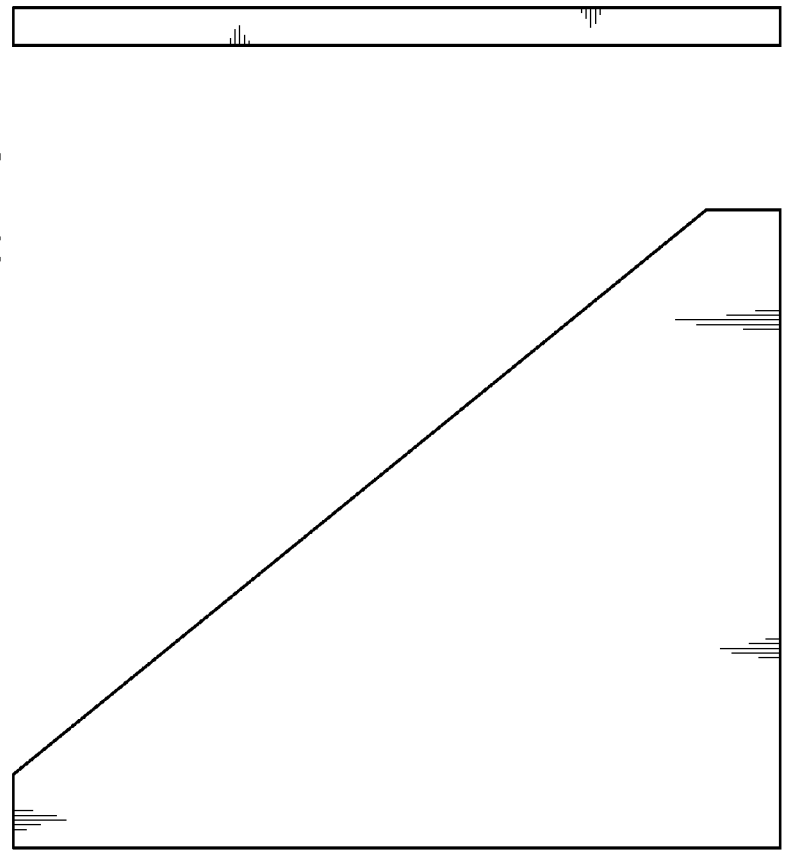
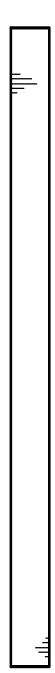
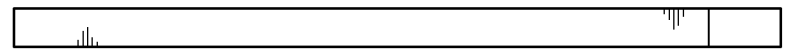
FIG. 12A  FIG. 12C
FIG. 12B
FIG. 12E
FIG. 12F

FIG. 13F
FIG. 13E
FIG. 13A
FIG. 13C
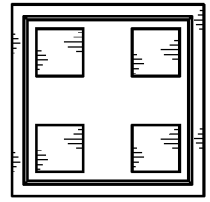
FIG. 13D
FIG. 13B

CONFIGURABLE SHELF ASSEMBLY

FIELD

The present specification relates generally to shelf assemblies, and more particularly to a shelf assembly that can be assembled in multiple configurations.

BACKGROUND

Shelf assemblies are generally known. For example, various shelves are sold as shelf assemblies in a box of parts for subsequent assembly at site where the shelf assembly is to be used. Typically, assembly requires multiple tools for fastening parts together somewhat permanently. For example, some components can be fastened using nails, woodscrews or adhesives making disassembly difficult. In addition, the shelf assembly generally can only be assembled in one configuration.

Other shelf assemblies are easier to assemble and involve attaching posts to panels temporarily without using permanent fasteners. However, these shelf assemblies are often less stable and difficult to assemble and align than when assembling using permanent fasteners.

SUMMARY

In accordance with an aspect of the invention, there is provided a shelf assembly. The shelf assembly includes a board configured to support an item on a first surface. In addition, the shelf assembly includes a plurality of connectors disposed on a second surface of the board. The second surface is opposite the first surface. Furthermore, the shelf assembly includes a plurality of legs, wherein each leg includes a first end and a second end. The first end is configured to mate with a connector from the plurality of connectors. The shelf assembly also includes a shoe configured to be attached to the second end of a leg from the plurality of legs. The shelf assembly additionally includes a shoe magnet disposed in the shoe. The shoe magnet is configured to couple with a positioning element for positioning the shoe The shelf assembly may further include an additional shoe magnet disposed in the shoe proximate to the shoe magnet. The additional shoe magnet may be configured to couple with the base ferromagnetic material for positioning the shoe in an alternate position.

The connector from the plurality of connectors may be disposed near an edge of the board.

The leg may be configured to partially mate with the connector and an additional connector disposed on an additional board, wherein the leg connects the board to the additional board.

The leg may be configured to mate with the connector using a friction fit.

The shoe may include a non-slip surface.

The non-slip surface may be a silicone surface.

The shelf assembly may further include an additional shoe magnet disposed in the shoe proximate to the shoe magnet. The additional shoe magnet may be configured to couple with the base ferromagnetic element for positioning the shoe in an alternate position.

The board may include a positioning element to couple with an additional leg.

The positioning element may be a ferromagnetic material.

In accordance with an aspect of the invention, there is provided a shoe configured to magnetically couple with a board having a plurality of positioning elements. The shoe includes a resiliently deformable body configured to be inserted in a leg. The resiliently deformable body provides a friction fit within the leg. Furthermore, the shoe includes a surface of the resiliently deformable for resting on the board. In addition, the shoe includes a ferromagnetic element configured to couple with a positioning element from the plurality of positioning elements.

The ferromagnetic element may be a magnet.

The shoe may further include an additional ferromagnetic element configured to couple with another positioning element from the plurality of positioning elements.

In accordance with an aspect of the invention, there is provided a board configured to magnetically couple with a shoe having a ferromagnetic element. The board includes a rigid material configured to support an item on a first surface. The board also includes a plurality of connectors configured to mate with a leg. The plurality of connectors disposed on a second surface opposite the first surface. The board further includes a plurality of positioning elements distributed across the rigid material. Each positioning element from the plurality of positioning elements is configured to couple with a ferromagnetic element in a shoe.

The plurality of positioning elements may be disposed on the second surface.

Each of the positioning elements from the plurality of positioning elements may by secured to the second surface with a friction fit mechanism.

The plurality of positioning elements may be disposed within each of the connectors in the plurality of connectors for aligning the leg with an additional leg placed on the first surface.

Each of the plurality of connectors may be configured to mate with the leg using a friction fit.

The plurality of positioning elements may be embedded within the rigid material.

The plurality of positioning elements may be a plurality of magnets.

BRIEF DESCRIPTION OF THE DRAWINGS

Reference will now be made, by way of example only, to the accompanying drawings in which:

FIGS. 9a-f are additional views of another board in accordance with the embodiment shown in FIG. 1;

FIGS. 10a-f are additional views of another board in accordance with the embodiment shown in FIG. 1;

FIGS. 12a-f are additional views of another board in accordance with the embodiment shown in FIG. 1;

FIGS. 13a-f are additional views of a leg in accordance with the embodiment shown in FIG. 1.

DETAILED DESCRIPTION OF THE EMBODIMENTS

As used herein, any usage of terms that suggest an absolute orientation (e.g. "top", "bottom", "front", "back", etc.) are for illustrative convenience and refer to the orientation shown in a particular figure. However, such terms are not to be construed in a limiting sense as it is contemplated that various components will, in practice, be utilized in orientations that are the same as, or different than those described or shown.

Figure 1:
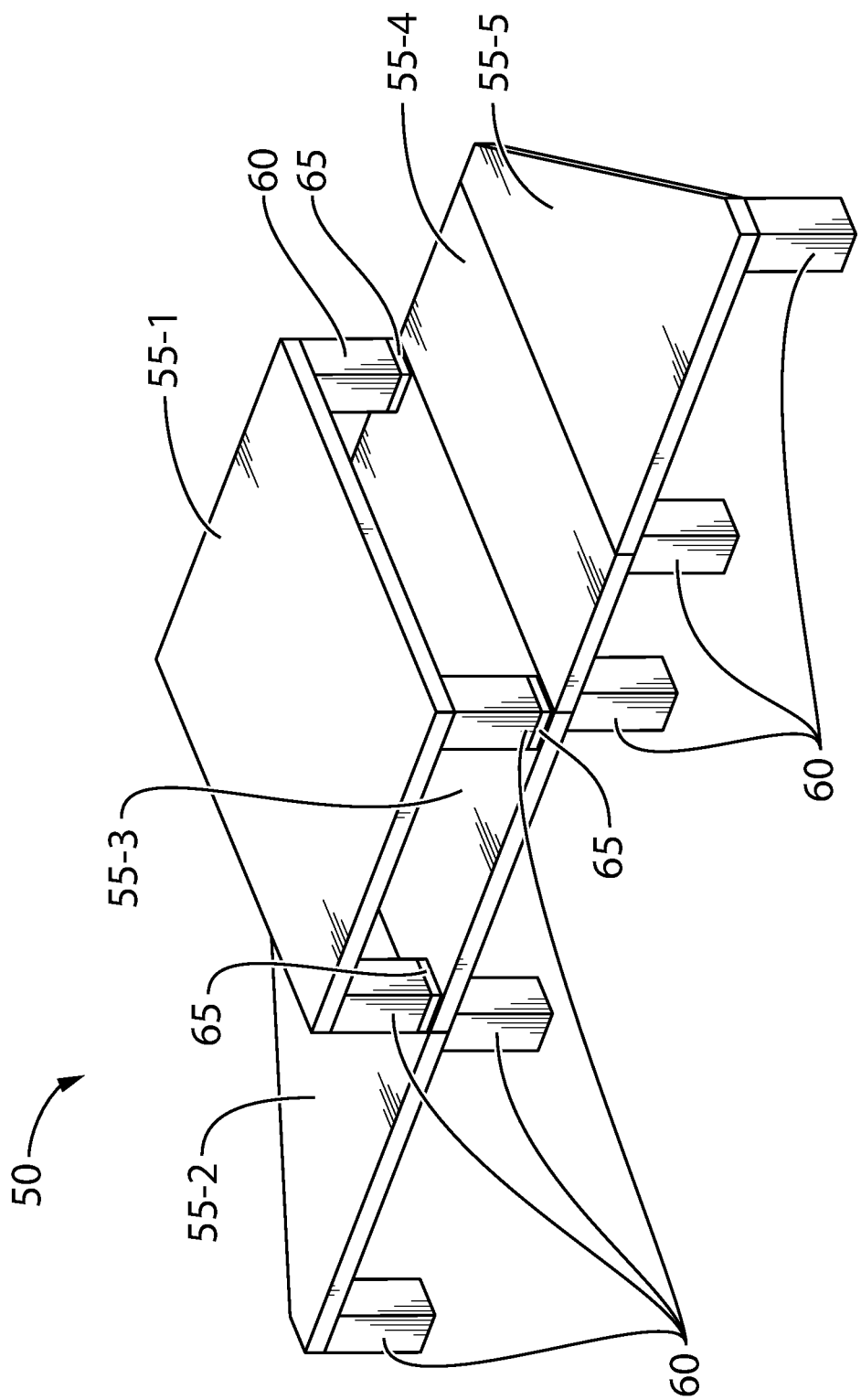
FIG. 1 is a perspective view of a shelf assembly according to an embodiment.

Referring to FIG. 1, a configurable shelf assembly is generally shown at 50. It is to be understood that the shelf assembly 50 is purely exemplary and that it will become apparent to those skilled in the art that modifications to the shelf assembly 50 are contemplated. For example, the shelf assembly 50 can be re-configured by modifying the stacking arrangement or by adding additional components to expand the shelf assembly 50, which will be discussed in greater detail below. The shelf assembly 50 is not particularly limited and can be used in a wide variety of applications. For example, the shelf assembly 50 can be used as a bookshelf, laundry room shelves, or any other application where items are to be stored in a space efficient manner.

The shelf assembly 50 is generally configured to support items thereon for various purposes. For example, the shelf assembly 50 can be used to organize a space or for displaying items. In the present embodiment, the shelf assembly 50 includes boards 55-1, 55-2, 55-3, 55-4, 55-5 (generically, board 55 and collectively boards 55, this nomenclature is used elsewhere herein), a plurality of legs 60, and a plurality of shoes 65 attached to at least some of the legs 60. It is to be appreciated by a person of skill in the art with the benefit of this description that the shelf assembly 50 can be sold with each of the components assembled together or separately as a kit of parts to be assembled on site.

Figure 2A:
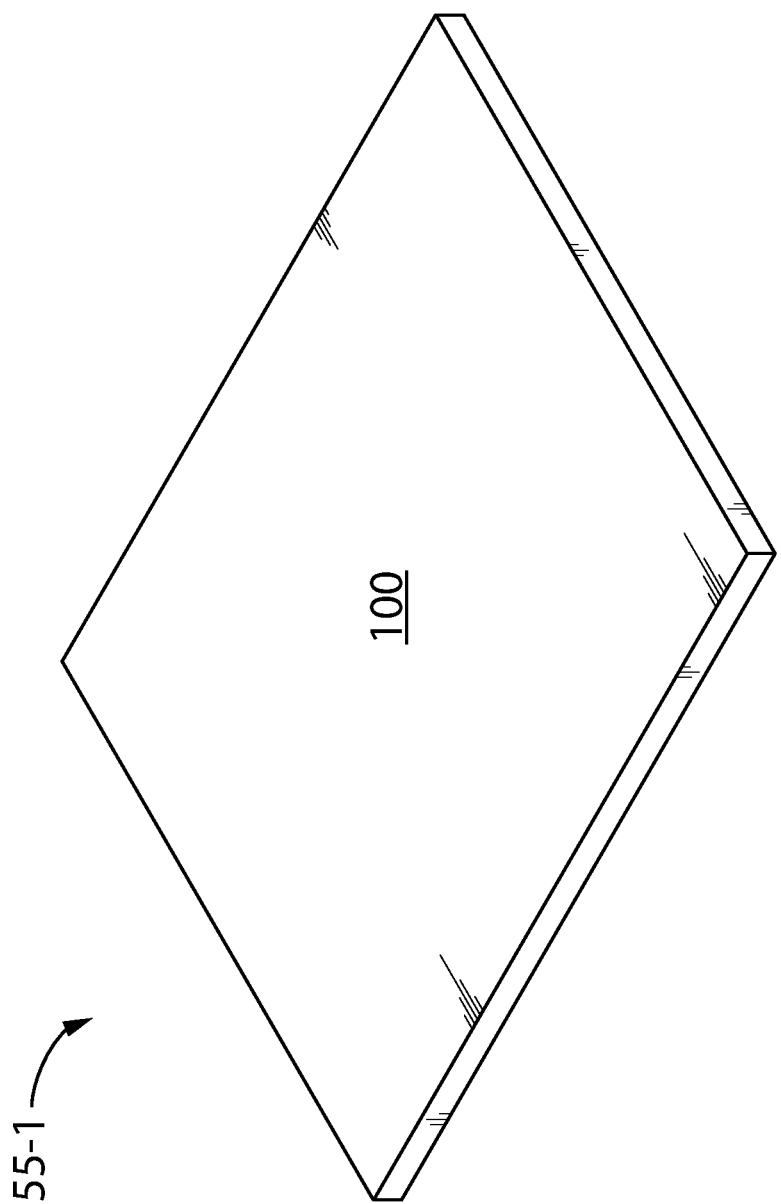
FIGS. 2a-b are perspective views of a board in accordance with the embodiment shown in FIG. 1.
Figure 2B:
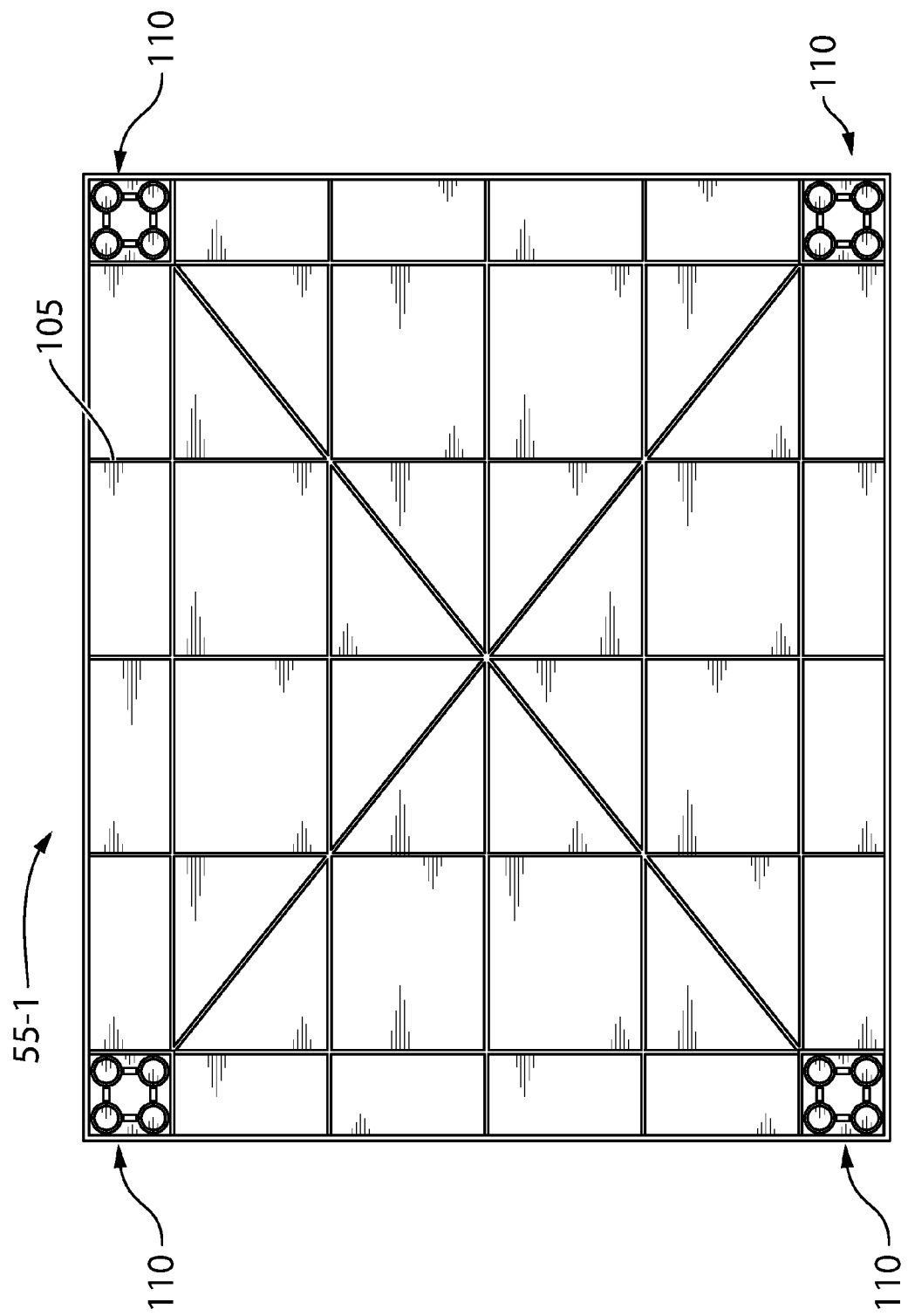

Referring to FIGS. 2a and 2b, the board 55-1 is shown in greater detail. In the present embodiment, the board 55-1 is generally configured to support item(s) on a top surface 100. It is to be understood by a person of skill in the art with the benefit of this description that the board 55-1 is not particularly limited to any material and that several variations are contemplated. For example, in the present embodiment, the board 55-1 is made from acrylonitrile butandiene styrene (ABS) plastic. In other embodiments, the board 55-1 can be made from other plastics or other materials such as carbon fiber composites, glass, rubber, wood, and rigid materials with mechanical properties that are sufficient for supporting the weight of the item(s). In further embodiments, the board 55-1 can be substantially made of metal such as aluminum, titanium, steel, etc. if designed with sufficient spaces to not affect magnetic fields near positioning elements 125 as discussed in greater detail below.

In the present embodiment, the board 55-1 includes ridges 105 on the bottom surface. The ridges form a grid and diagonal pattern as shown in FIG. 2b. However, it is to be appreciated that the exact pattern of the ridges is not particularly limited. For example, the ridges 105 can be parallel, a cross pattern, any other type of pattern, or omitted in other embodiments. The ridges 105 are generally configured to provide additional structural rigidity and strength without having to increase the overall thickness of the board 55-1. Accordingly, the ridges 105 allow for less material to be used in the board 55-1 while maintaining similar mechanical characteristics resulting in lighter a weight as well as decreased manufacturing costs since less materials are used. In further embodiments, the board 55-1 may also include gussets (not shown) to further improve mechanical rigidity. Although the ridges 105 are disposed on the bottom surface, it is to be appreciated that the ridges 105 can also be disposed on the top surface in some embodiments and can also function to create divided sections on the top surface to separate items and improve organization functionality of the shelf assembly 50.

It is also to be appreciated that the shape of the board 55-1 is not particularly limited and that various shapes are contemplated. For example, the board 55-1 is generally square in shape. The board 55-1 can be substituted with the board 55-2 and 55-5 (generally triangular), 55-4 (generally rectangular), or a board of another shape. Other shapes can include round boards, hexagonal boards, and other boards having irregular shapes and/or polygonal shapes.

Figure 3A:
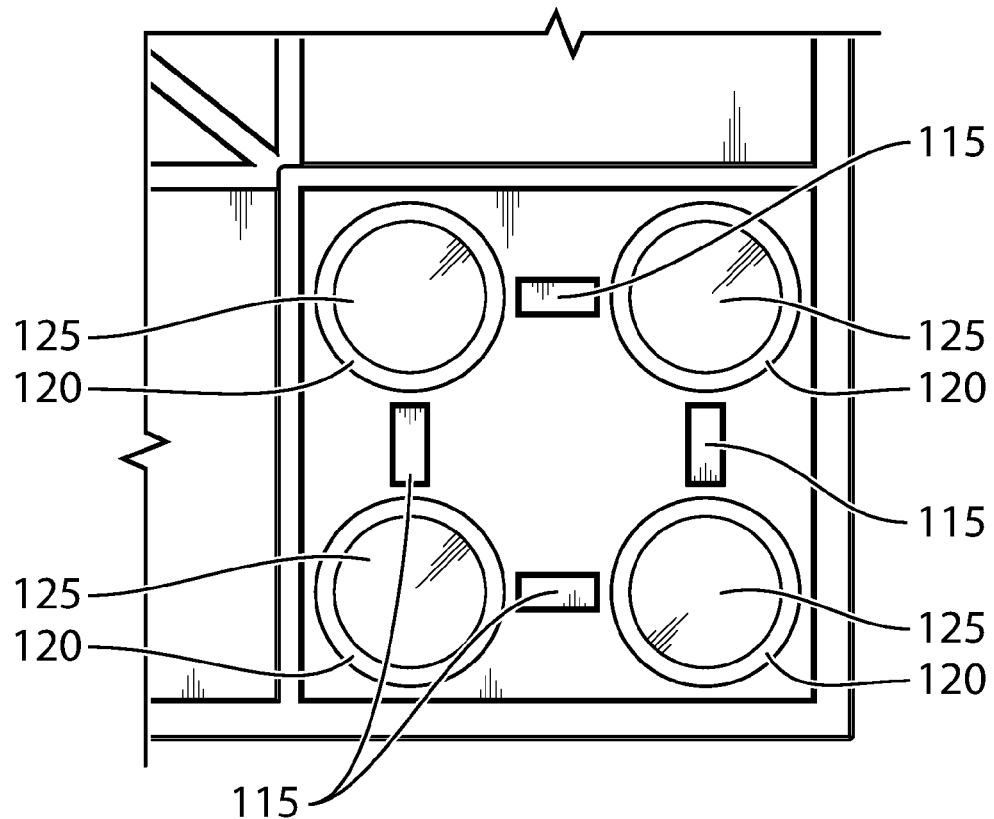
FIGS. 3a-c are a) a zoomed in view, b) a cross section view of a connector on the board in accordance with the embodiment shown in FIG. 1, and c) a zoomed in view in accordance with another embodiment.
Figure 3B:
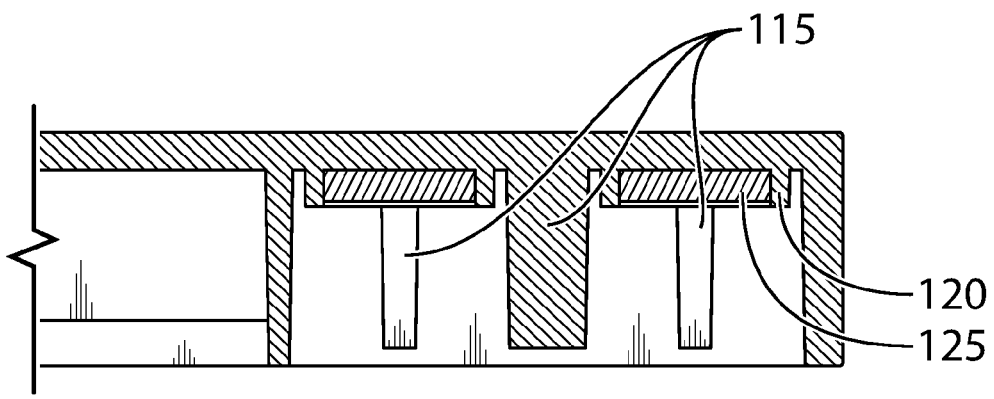

The board 55-1 further includes a plurality of connectors 110 (generically, connector 110 and collectively connectors 110, this nomenclature is used elsewhere herein) as shown in greater detail in FIGS. 3a and 3b generally configured to secure a leg 60 to the board 55-1. Each of the connectors 110 includes a plurality of tabs 115 configured to receive a peg 205 to mechanically secure the peg 205 therein. In particular, adjacent tabs 115 are configured to receive a peg 205 from a leg 60 to secure the leg 60 in place using a friction fit about at least one of the pegs 205. It is to be appreciated that the friction fit does not necessary need to involve two tabs 115. Instead, the connector 110 can include more tabs to engage the peg 205 to increase stability. In other embodiments, the connector can include an opening having similar dimensions as the peg 205 into which the peg 205 can be inserted.

Figure 3C:
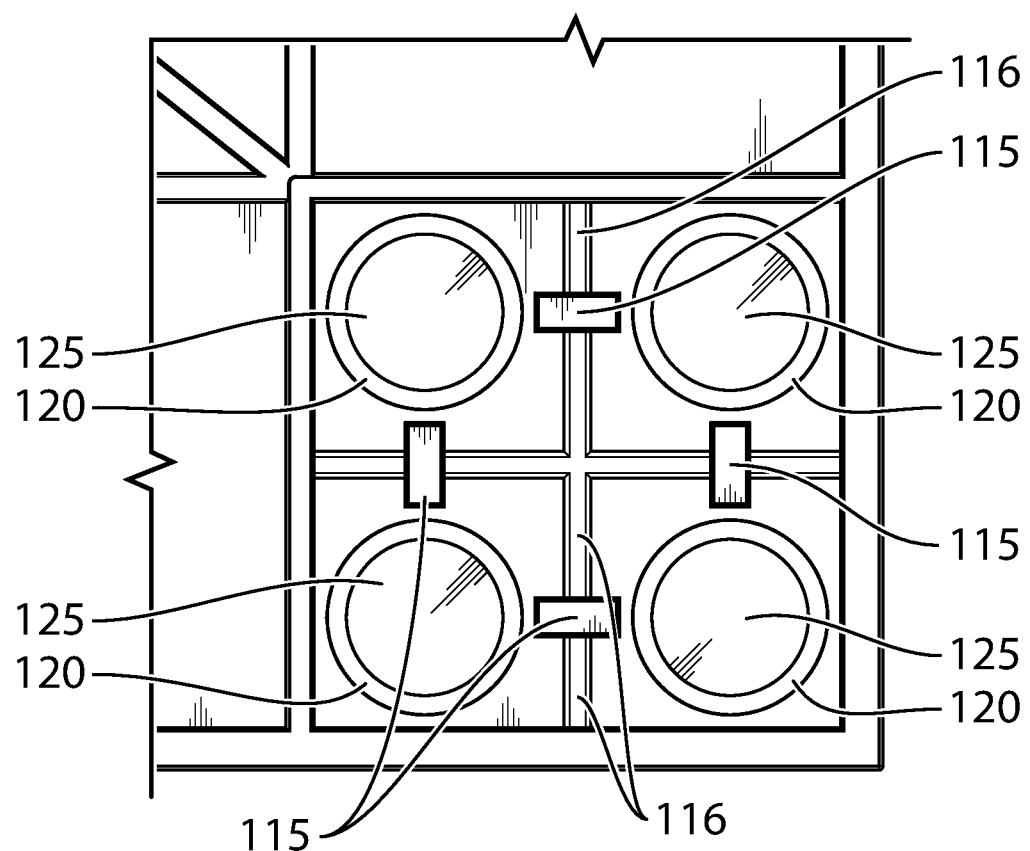

Furthermore, it is to be appreciated that the connectors 110 are not particularly limited a friction fit mechanism and that various connection mechanisms are contemplated. For example, other embodiments can use clips, magnets or other means to secure a leg 60 to the board 55-1. As another example of a variation, FIG. 3c shows the connector 110 with additional ridges 116 to provide further mechanical stability. It is to be appreciated that the ridges 116 can be a different material or formed from a molding process in the manufacture of the board 55-1.

The connector 110 also includes a holder 120 for securing a positioning element 125 within the board 55-1. In the present embodiment, the holder 120 comprises a ring generally configured to secure the positioning element 125 using a friction fit. It is to be appreciated that the holder 120 is not particularly limited and can be modified to be any shape dependent on the positioning element 125. In other embodiments, the holder 120 can be modified to be a plurality of tabs, clips or other mechanisms capable of holding the positioning element 125. It is to be appreciated that the holder 120 can be modified to be located elsewhere on the board 55-1 for positioning additional legs 60 above the board 55-1 at different location not associated with a connector 110. In further embodiments, the holder 120 can be omitted when the positioning element 125 is to be attached using other means such as adhesives or embedded within the board 55-1.

In the present embodiment, the positioning element 125 is a rare-earth magnet, such as a neodymium magnet having a grade of N48. However, it is to be appreciated by a person of skill in the art that the positioning element 125 is not particularly limited and can be substituted in other embodiments. For example, the positioning element 125 can be a stronger or weaker magnet, or a magnet of a different type. In other embodiments, the positioning element 125 can be substituted with a ferromagnetic material, such as iron, nickel, cobalt, or certain alloys thereof configured to magnetically couple with an external magnet.

The positioning of the connectors 110 on the bottom surface of the board 55-1 is also not particularly limited. In the present embodiment, the board 55-1 includes connectors 110 at the corners or edge. However, in other embodiments, there can be more or less connectors 110. For example, an additional connector 110 can be added in the center of the board 55-1 to allow an additional leg 60 to provide further support. In other embodiments, additional connectors 110 can be distributed across the bottom surface to allow for greater customization when assembling the configurable shelf assembly.

It is to be re-emphasized that the board 55-1 described above is a non-limiting representation only and that additional variations are contemplated. As an example of a variation, it is to be appreciated that the position elements 125 can be omitted from the board 55-1 if the board is intended to be at the top of the shelf assembly 50 since no additional legs 60 would need to be positioned on top. As another example of a variation, the positioning elements 125 can be disposed on the top surface of the board 55-1.

Figure 4A:
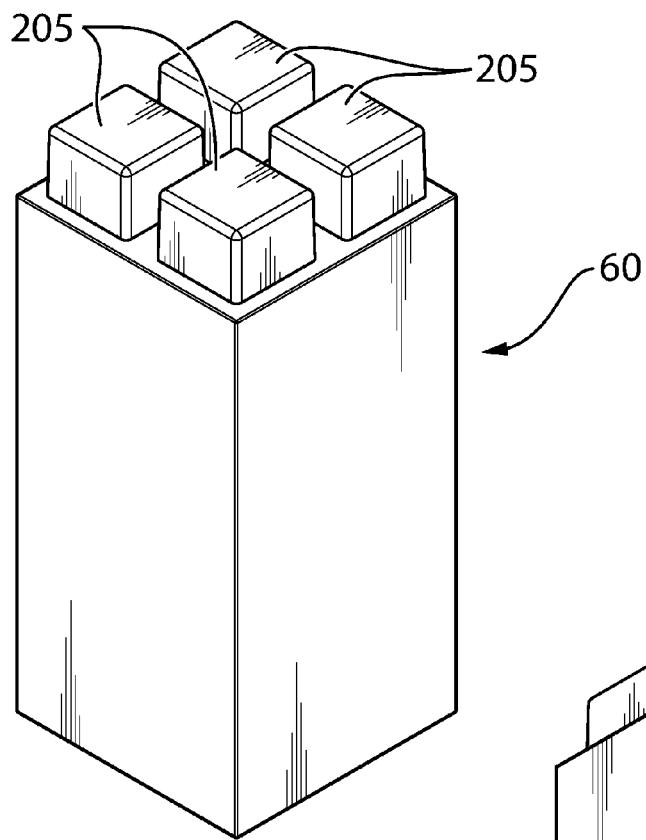
FIGS. 4a-b are perspective views of a leg in accordance with the embodiment shown in FIG. 1.
Figure 4B:
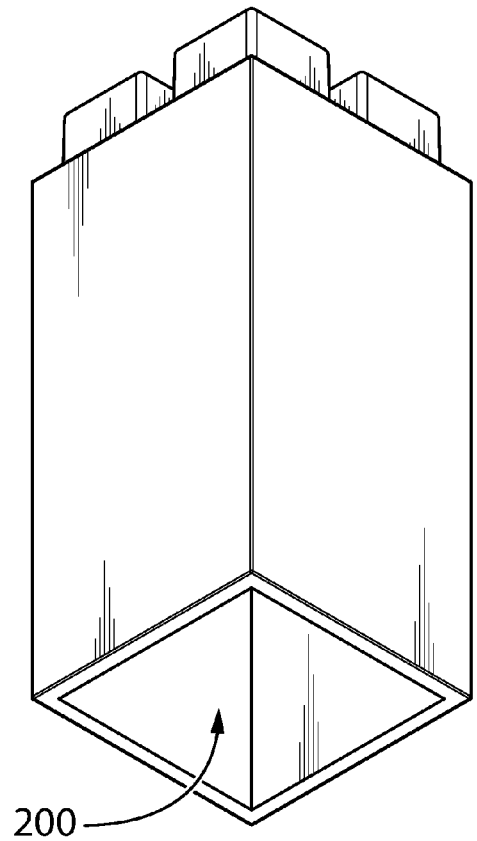

Referring to FIGS. 4a and 4b, an example of a leg 60 is shown in detail. The leg 60 is generally configured to support at least a portion of the weight of the board 55-1 and items placed thereon. The leg 60 is not particularly limited in design and material and variations are contemplated. In the present embodiment, the leg 60 is a hollow square column constructed from a hard plastic such as acrylonitrile butandiene styrene. In other embodiments, the leg 60 can be a different shape, such as round, triangular, rectangular, hexagonal, or any other regular or irregular shape. In addition, the leg 60 can be solid instead of hollow, and can be modified to be made from wood, carbon fiber composites, glass, rubber, and rigid materials with mechanical properties that are sufficient for supporting the board 55-1.

The leg 60 includes an opening 200 at a bottom end and a plurality of pegs 205 disposed at a top end. The opening is generally configured to for receiving a shoe 65. It is to be appreciated that the opening 200 is not particularly limited and can be varied in size and shape. In the present embodiment, the leg 60 includes four square pegs 205 disposed at the top end. Each of the pegs 205 is generally configured to mate with the connector 110 by fitting within a square cavity defined by the walls of the connector 110 and the tabs 115. It is to be appreciated that although the connector 110 is configured to receive all four pegs 205, the leg 60 can mate with the connector 110 using fewer than all four pegs 205 as discussed in greater detail below.

It is to be appreciated that the design and dimensions of the leg 60 is not particularly limited. For example, the leg 60 can include more or less than 4 pegs. In other embodiments, the leg 60 can include a single peg 205 configured to mate with the connector 110. Alternatively, the leg 60 can include more pegs 205 for mating with the connector 110 in additional positions. As another variation, the overall length of the leg 60 is not particularly limited and can be longer or short. However, it is to be appreciated that by using standard set of lengths, the legs 60 would be interchangeable with other legs 60 in the shelf assembly should replacement or reconfiguration be required.

Figure 5A:
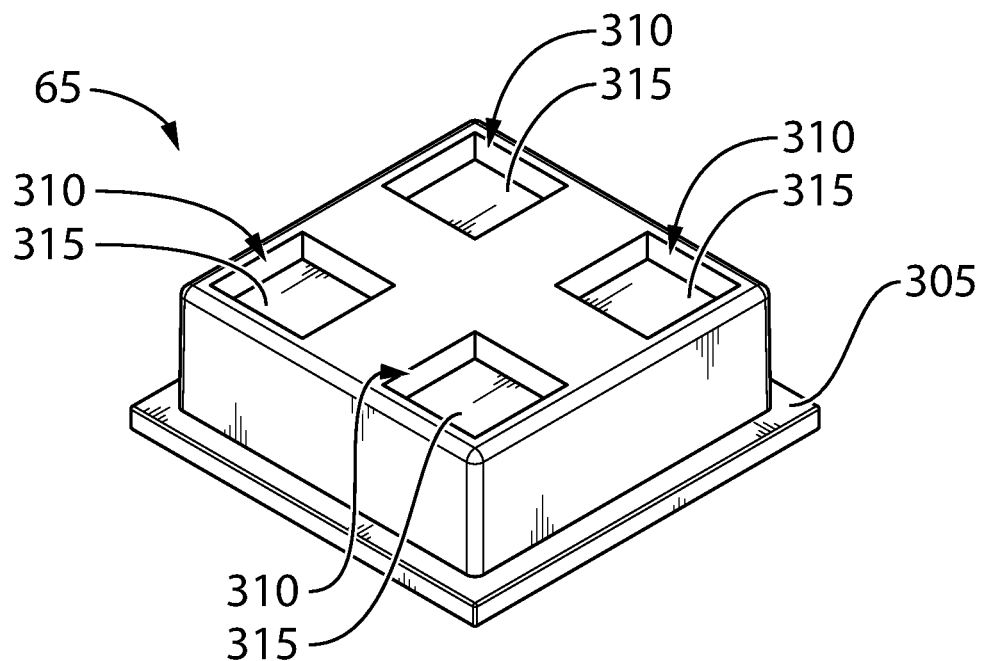
FIGS. 5a-b are perspective views of a shoe in accordance with the embodiment shown in FIG. 1.
Figure 5B:
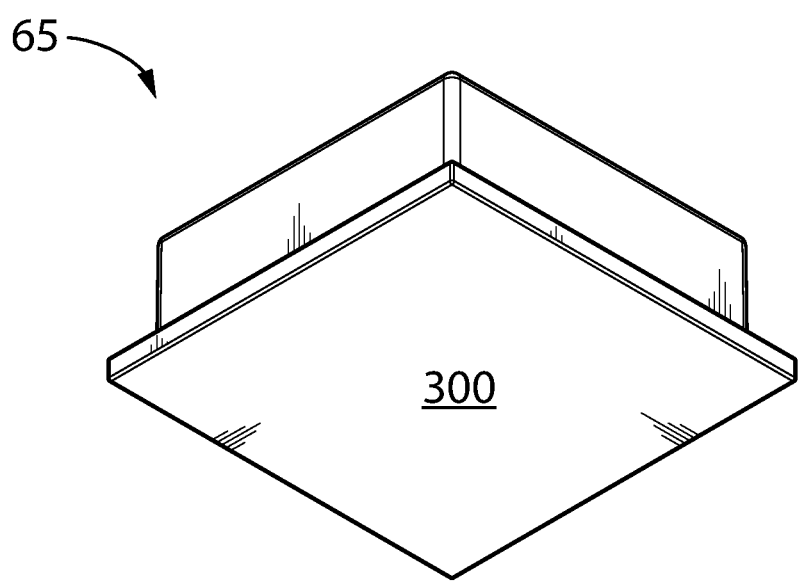

Referring to FIGS. 5a and 5b, an example of a shoe 65 is shown in detail. The shoe 65 is generally configured to be attached to the bottom end of the leg 60. The shoe 65 includes a non-slip surface 300, a lip 305, and a plurality of openings 310 configured to receive ferromagnetic elements 315.

In the present embodiment, the shoe 65 is generally configured to be inserted into the opening 200 and held in place using a friction fit. It is to be understood by a person of skill in the art with the benefit of this description that the shoe 65 is not particularly limited to any material and that several variations are contemplated. For example, in the present embodiment, the shoe 65 is made from a soft resilient material such as silicone. In other embodiments, the shoe 65 can be made from plastics or other materials such as, rubber, wood, and materials. In further embodiments, the shoe 65 can be substantially made of metal, such as aluminum, titanium, steel, etc.

The lip 305 is generally configured to prevent the shoes from being inserted too far into the leg 60 and to ensure that the non-slip surface 300 maintains substantial contact with the base on which the leg 60 rests to reduce slippage. The non-slip surface 300 is not particularly limited and any manner that provides a higher coefficient of friction with a base can be used. In the present embodiment, the shoe 65 is entirely made from silicone which inherently has a high coefficient of friction with many materials. The non-slip surface 300 can include a coating to further increase the friction with specific surfaces. In other embodiments, the non-slip surface 300 can include a textured pattern as well. It is to be appreciated by a person of skill in the art with the benefit of this description that the non-slip surface 300 can be modified depending on the base on which the shoe 65 will rest as a different base would be best suited for different materials to reduce slippage.

The shoe 65 also includes openings 310 for receiving ferromagnetic elements 315 within the shoe 65 proximate to each other. In the present embodiment, the openings 310 are square in shape and generally configured to secure the ferromagnetic elements 315 using a friction fit. It is to be appreciated that the openings 310 are not particularly limited and can be modified to be any shape dependent on the ferromagnetic elements 315. In other embodiments, the openings 310 can be modified to be a plurality of tabs, clips or other mechanisms capable of holding the ferromagnetic elements 315. By having the openings 310 secure ferromagnetic elements 315 proximate each other, it is to be appreciated that the position of the leg 60 relative to the positioning element 125 is generally fixed and can be coupled at discreet locations corresponding to a ferromagnetic element 315 coupling with a positioning element 125 or at alternate positions where an adjacent ferromagnetic element 315 can couple with the positioning element 125. In other embodiments, the openings can be omitted when the ferromagnetic elements 315 can be attached using other means such as adhesives or embedded within the shoe 65. In some embodiments, the shoe 65 can be made substantially from a ferromagnetic material such that the ferromagnetic elements 315 are not needed.

In the present embodiment, the ferromagnetic elements 315 are rare-earth magnets, such as a neodymium magnet having a grade of N48 similar to the positioning elements 125. However, it is to be appreciated by a person of skill in the art that the ferromagnetic elements 315 are not particularly limited and can be substituted in other embodiments. For example, the ferromagnetic elements 315 can be a stronger or weaker magnet, or a magnet of a different type. In other embodiments, the ferromagnetic elements 315 can be a ferromagnetic material, such as iron, nickel, cobalt, or certain alloys thereof configured to magnetically couple with an external magnet, such as the position element 125. It is to be appreciated by a person of skill in the art with the benefit of this description that one of the positioning element 125 and the ferromagnetic elements 315 is a permanent magnet, while the other can be either a permanent magnet or unmagnetized.

Figure 6:
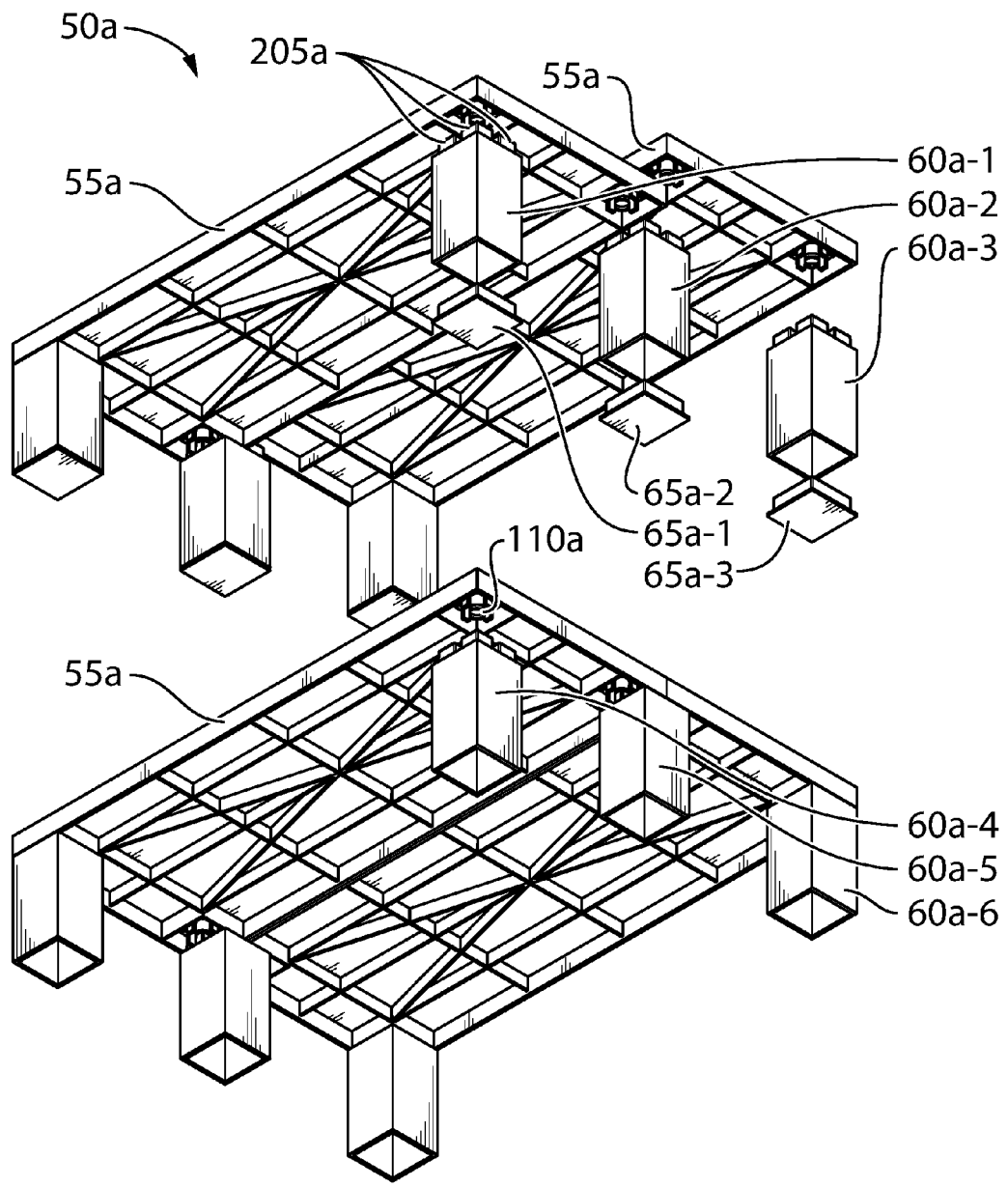
FIG. 6 is a perspective blown apart view of a shelf assembly according to another embodiment.

Referring to FIG. 6, another embodiment of a shelf assembly is generally shown in a blown up view at 50a. In the present embodiment, like components of the shelf assembly 50a bear like reference to their counterparts in the shelf assembly 50, except followed by the suffix "a". In the present embodiment, the shelf assembly 50a is a two-level shelf having 4 boards 55a, twelve legs 60a, and twelve shoes 65a. As shown, legs 60a-1, 60a-3, 60a-4, and 60a-6 each engage with a connector 110a by having all four pegs 205a mating with the corner connectors. The legs 60a-2 and 60a-5 each partially mate with two connectors 110a from adjacent boards 55a. Accordingly, two pegs 205a from each of the legs 60a-2 and 60a-5 mate with a connector 110a and the other two pegs 205a mate with a separate connector 110a from an adjacent board 55a. It is to be appreciated that by using a single leg 60a to connect adjacent board 55a, fewer materials can be used to assemble the shelf assembly 50a in addition to being able to provide improved alignment of the boards 55a. In addition, the leg 60a can function to connect the adjacent boards to provide a stable configuration. In other embodiments, the leg 60a can be used to mate with four separate connectors 110a, where one peg 205a is inserted in each of the connectors 110a. Therefore, larger shelf assemblies can be configured using few legs 60a.

While the foregoing provides certain non-limiting example embodiments, it should be understood that combinations, subsets, and variations of the foregoing are contemplated. For example, instead of having a leg 60 connect with a single connector 110, the legs 60 can be modified to connect with multiple connectors. It is to be appreciated that in such embodiments, the legs can effectively form walls to further improve organization.

In the present embodiment, the ferromagnetic element of the shoes 65a-1, 65a-2, and 65a-3 are coupled to positioning elements in the boards 55a below. It is to be appreciated by a person of skill in the art that the combination of the magnetic coupling with the non-slip surface 300a provides a stable shelf assembly 50a where the legs 60a will are firmly in place.

Figure 7:
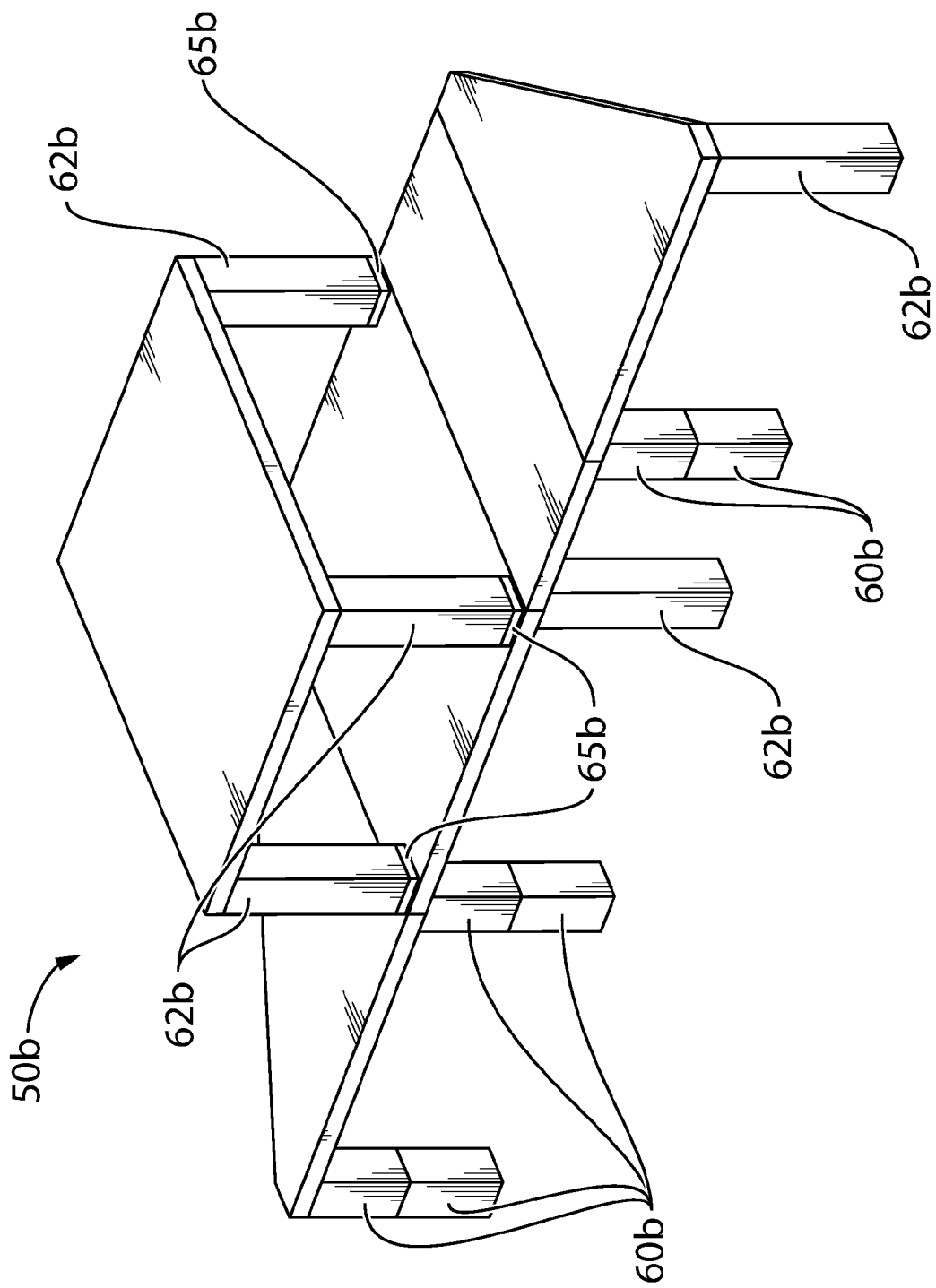
FIG. 7 is a perspective view of a shelf assembly according to another embodiment.
Figure 8C:
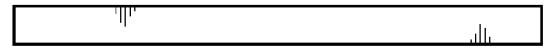
FIGS. 8a-f are additional views of a board in accordance with the embodiment shown in FIG. 1.
Figure 8B:
Figure 8A:
Figure 8E:
Figure 8F:
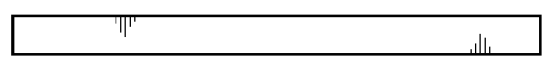
Figure 8D:
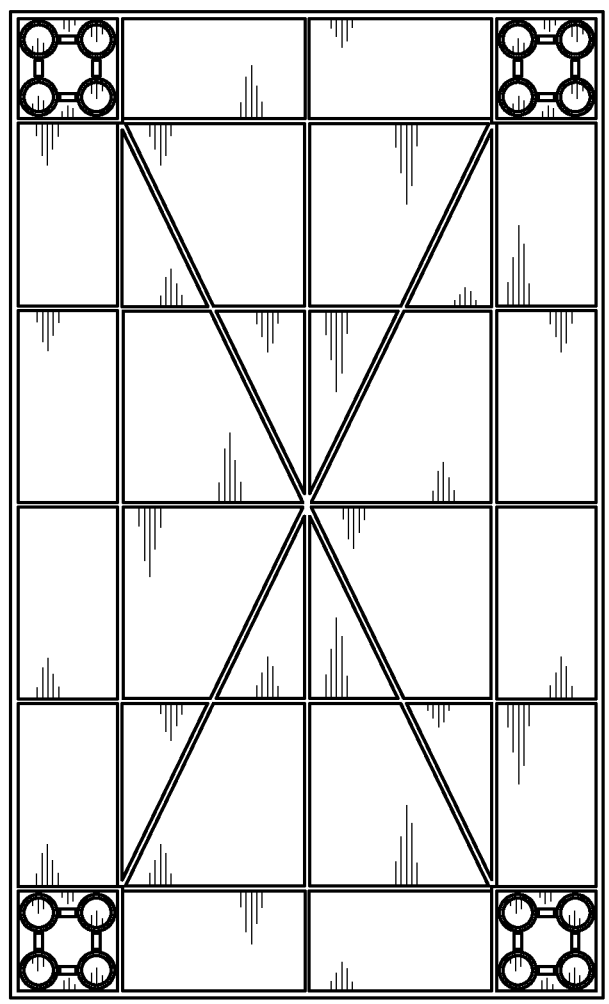
Figure 9D:
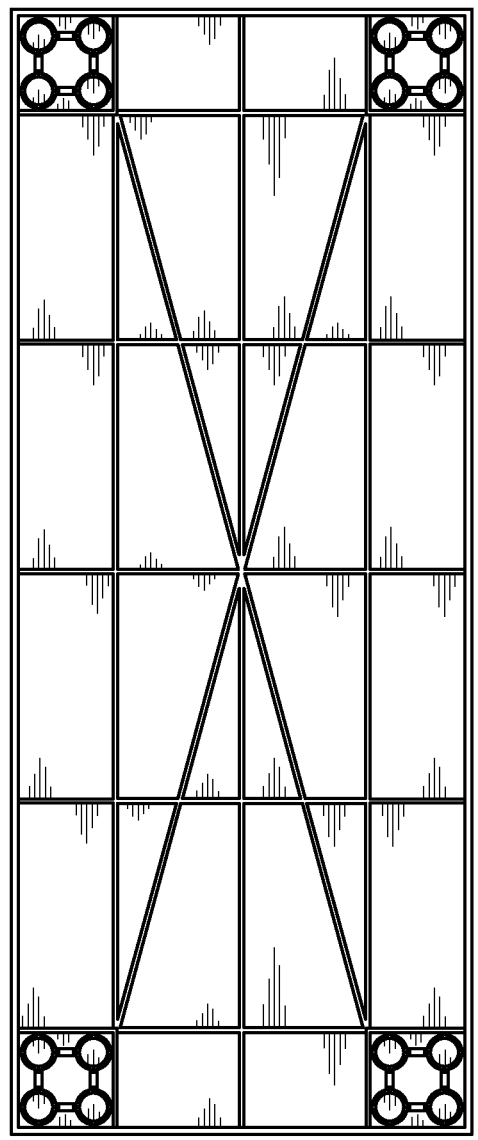
Figure 10D:
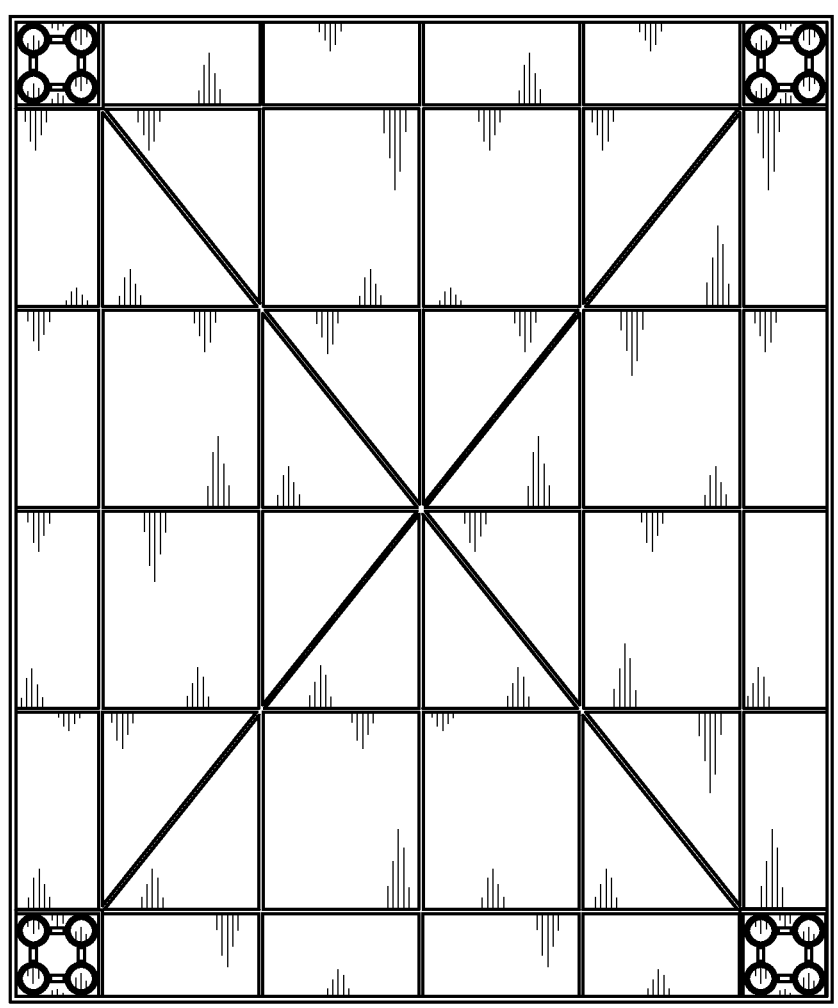
Figure 11C:
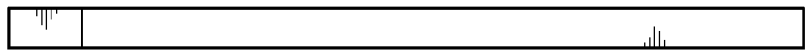
FIGS. 11a-f are additional views of another board in accordance with the embodiment shown in FIG. 1.
Figures 11A, 11B, 11E:
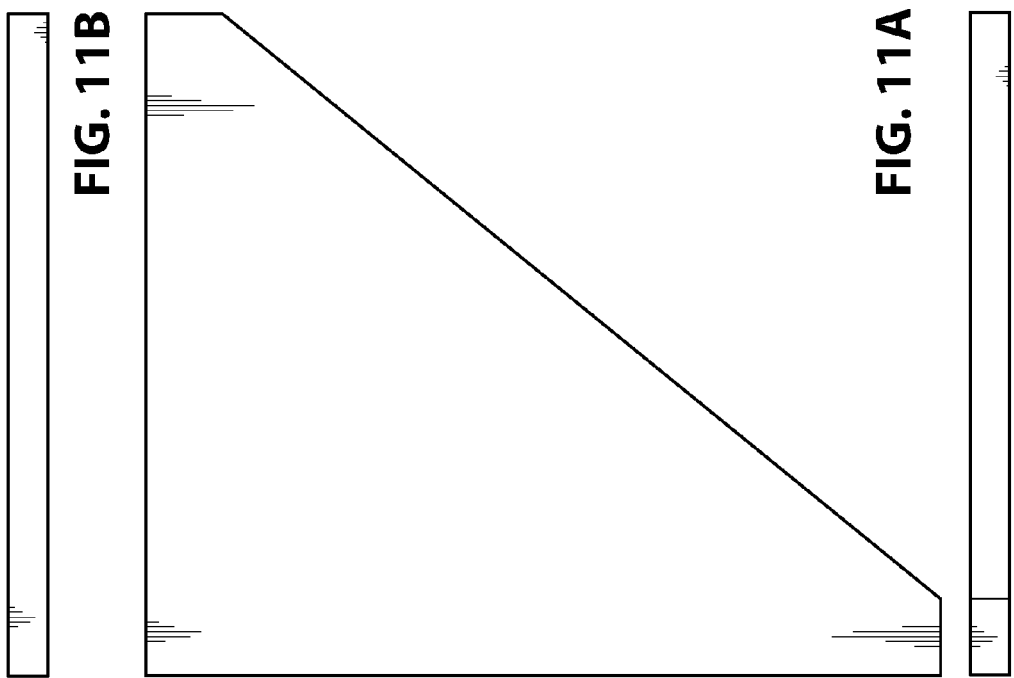
Figure 11F:
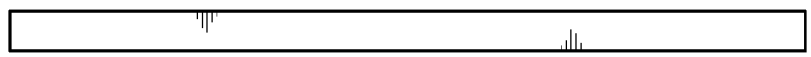
Figure 11D:
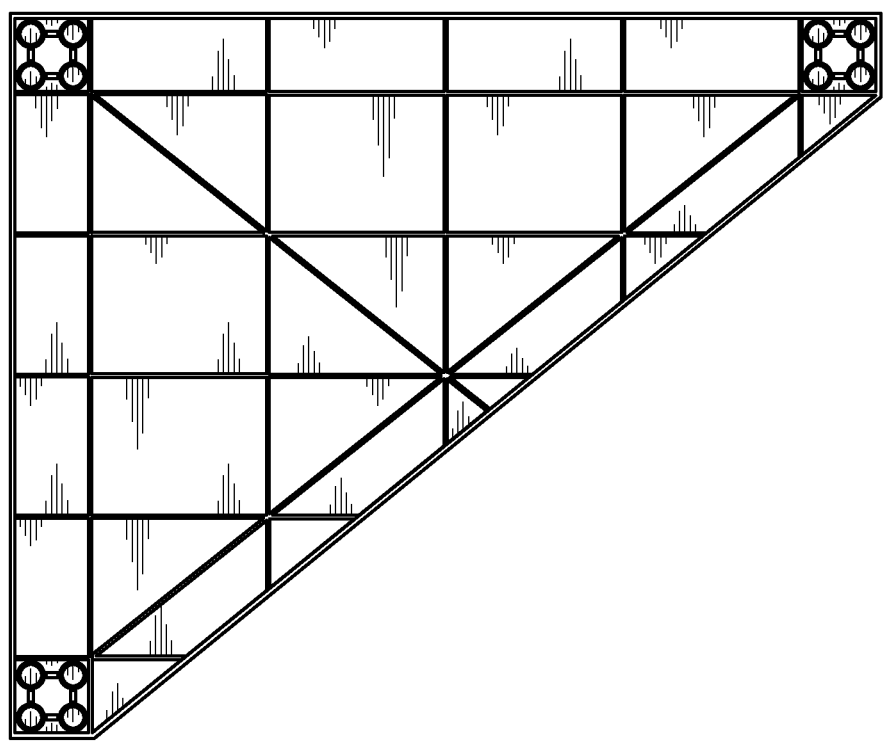
Figure 12D:
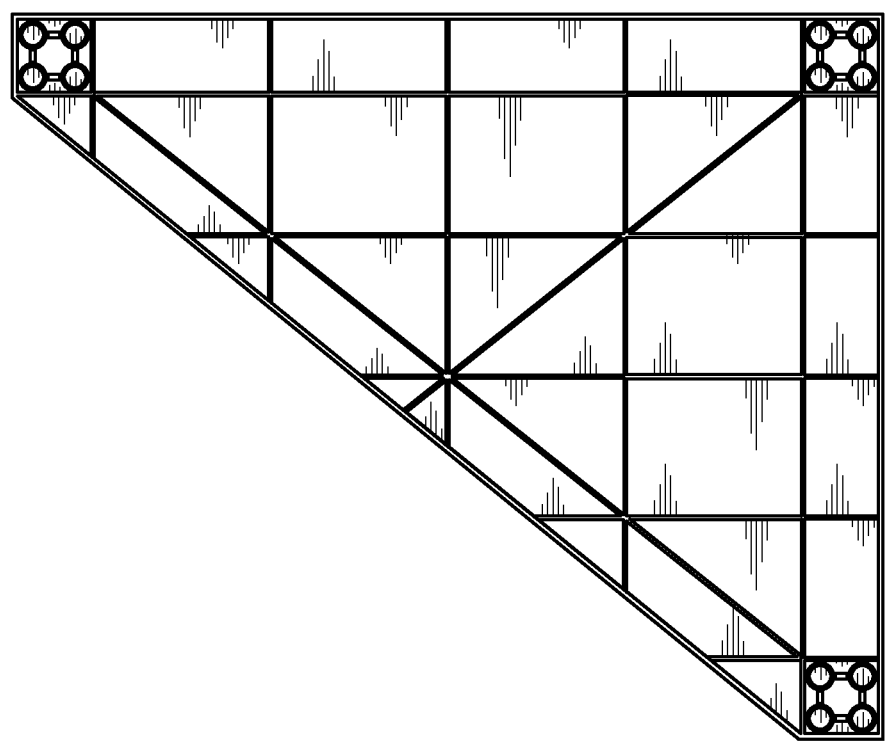
Figure 14F:
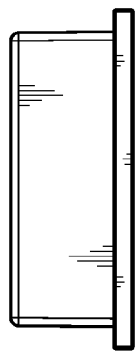
FIGS. 14a-f are additional views of a shoe in accordance with the embodiment shown in FIG. 1.
Figure 14E:
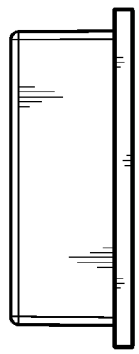
Figure 14A:
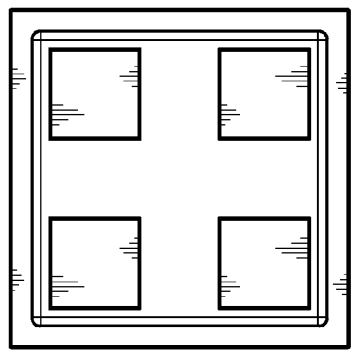
Figure 14C:
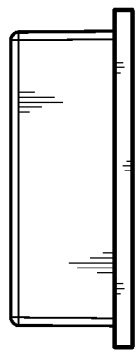
Figure 14D:
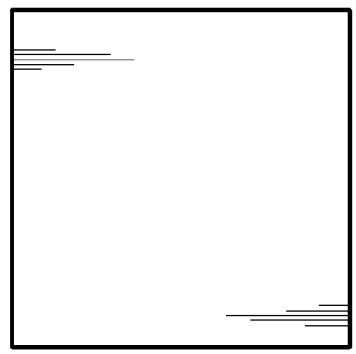
Figure 14B:
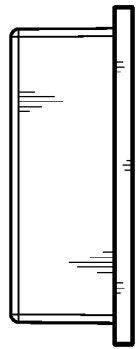

Referring to FIG. 7, another embodiment of a shelf assembly is generally shown in a blown up view at 50b. In the present embodiment, like components of the shelf assembly 50b bear like reference to their counterparts in the shelf assembly 50, except followed by the suffix "b". In the present embodiment, the shelf assembly 50a is a two-level shelf having 4 boards 55b, legs 60b, legs 62b, and shoes 65a. As shown, the legs 60b can also be inserted into each other to create extended legs. Alternatively, legs 62b having a longer length can be used. By combining the legs 60b or using legs 62b, the height of the shelf assembly 50b can be adjusted.

Referring to FIGS. 8 to 14, addition views of various components of the embodiment shown in FIG. 1 are also shown.

Various advantages will now be apparent to a person of skill in the art. Of note is the ability to configure and assemble the shelf assembly 50 from some simple components. Accordingly, each of the components, such as the board 55, the legs 60 and the shoes 65 can each be sold separately or as a set. In addition, by standardizing the components, additions to shelf assemblies 50 can also be readily added by obtaining more components separately. Furthermore, by magnetically coupling the legs 60 to a board 55 below and/or using a non-skid surface 300, improved stability is provided to the shelf assembly 50 as a whole while allowing the shelf assembly to be quickly disassembled and reassembled.

While specific embodiments have been described and illustrated, such embodiments should be considered illustrative only and should not serve to limit the accompanying claims.

What is claimed is:

1. A shelf assembly comprising:
   a board configured to support an item on a first surface;
   a plurality of connectors disposed on a second surface of the board, the second surface opposite the first surface;
   a plurality of legs, wherein each leg includes a first end and a second end; the first end configured to mate with a connector from the plurality of connectors;
   a shoe configured to be attached to the second end of a leg from the plurality of legs;
   a positioning element for positioning the shoe;
   a first shoe magnet disposed in the shoe, the first shoe magnet configured to couple with the positioning element for positioning the shoe in a first position; and
   a second shoe magnet disposed in the shoe proximate to the first shoe magnet, wherein the second shoe magnet is configured to couple with the positioning element for positioning the shoe in a second position.

2. The shelf assembly of claim 1, wherein the connector from the plurality of connectors is disposed near an edge of the board.

3. The shelf assembly of claim 2, further comprising an additional board having an additional connector, wherein the leg is configured to partially mate with the connector and the additional connector, and wherein the leg connects the board to the additional board.

4. The shelf assembly of claim 1, wherein the leg is configured to mate with the connector using a friction fit.

5. The shelf assembly of claim 1, wherein the shoe comprises a non-slip surface.

6. The shelf assembly of claim 5, wherein the non-slip surface is a silicone surface.

7. The shelf assembly of claim 1, wherein the positioning element is a ferromagnetic material.

\* \* \* \* \*